(12) United States Patent
Chen et al.

(10) Patent No.: US 9,267,057 B2
(45) Date of Patent: Feb. 23, 2016

(54) POLYIMIDE FILM INCORPORATING POLYIMIDE POWDER DELUSTRANT, AND MANUFACTURE THEREOF

(71) Applicant: Taimide Technology Incorporation, Hsinchu County (TW)

(72) Inventors: Chung-Yi Chen, Hsinchu County (TW); Chih-Wei Lin, Hsinchu County (TW); Chi-Huan Lo, Hsinchu County (TW); Shihan Tai, Hsinchu County (TW)

(73) Assignee: TAIMIDE TECHNOLOGY INCORPORATED (TW)

( * ) Notice: Subject to any disclaimer, the term of this patent is extended or adjusted under 35 U.S.C. 154(b) by 0 days.

(21) Appl. No.: 14/060,131

(22) Filed: Oct. 22, 2013

(65) Prior Publication Data

US 2014/0050935 A1    Feb. 20, 2014

Related U.S. Application Data

(63) Continuation-in-part of application No. 13/600,293, filed on Aug. 31, 2012.

(30) Foreign Application Priority Data

Dec. 16, 2011  (TW) ............... 100146877 A (51) Int. Cl.
*B32B 5/16* (2006.01)
*C09D 179/08* (2006.01)
(Continued)

(52) U.S. Cl.
CPC .............. *C09D 179/08* (2013.01); *C08G 73/10* (2013.01); *C08J 5/18* (2013.01); *C08K 13/02* (2013.01);
(Continued)

(58) Field of Classification Search
CPC ...... C08G 73/10; C08G 73/1067; C08K 3/04; C08K 7/16; C08K 13/02; C08L 79/08
USPC ........................................... 524/600; 428/327
See application file for complete search history.

(56) References Cited

U.S. PATENT DOCUMENTS 5,358,782 A * 10/1994 Parish ........................... 428/323
8,114,500 B2 * 2/2012 Yasuda ...................... C08J 5/18
                                                              427/337
(Continued)

FOREIGN PATENT DOCUMENTS

JP         04003492        1/1992
JP        2008-302696     12/2008
(Continued)

OTHER PUBLICATIONS

Office action from related Japanese patent application No. 2014-035392 issued on Jan. 27, 2015.
(Continued)

*Primary Examiner* — Jane L Stanley
(74) *Attorney, Agent, or Firm* — Baker & McKenzie LLP (57) ABSTRACT

A polyimide film includes a polyimide layer including a polyimide base polymer, and a polyimide powder distributed in the polyimide base polymer, the polyimide powder being obtained by reacting a diamine with a dianhydride at a molar ratio of about 1:0.950 to about 1:0.995. Moreover, the polyimide film may have a multilayered structure including at least a second polyimide layer stacked on a surface of the polyimide layer. The second polyimide can also include the polyimide powder at a weight ratio less than about 20 wt % of the total weight of the second polyimide layer. Embodiments described herein also include methods of preparing the polyimide films.

17 Claims, 2 Drawing Sheets (51) Int. Cl.
*C08G 73/10* (2006.01)
*C08L 79/08* (2006.01)
*C08K 13/02* (2006.01)
*C08J 5/18* (2006.01)

(52) U.S. Cl.
CPC .............. *C08L 79/08* (2013.01); *C08J 2379/08* (2013.01); *C08J 2479/08* (2013.01); *Y10T 428/31721* (2015.04)

(56) References Cited

U.S. PATENT DOCUMENTS

| | | | |
|---|---|---|---|
| 8,846,852 B2* | 9/2014 | Jeong | C08G 73/1039 428/1.26 |
| 2008/0213605 A1* | 9/2008 | Briney et al. | 428/473.5 |
| 2010/0062188 A1* | 3/2010 | Miyamoto et al. | 428/1.6 |
| 2011/0039085 A1* | 2/2011 | Carney et al. | 428/220 |
| 2011/0177321 A1* | 7/2011 | Carney et al. | 428/323 |
| 2011/0287243 A1* | 11/2011 | Carney et al. | 428/220 |
| 2012/0043691 A1* | 2/2012 | Uekido | 264/173.16 |
| 2013/0029148 A1* | 1/2013 | Carney et al. | 428/355 EP |
| 2013/0035447 A1 | 2/2013 | Jeong et al. | |
| 2013/0065033 A1* | 3/2013 | Wu | B32B 27/08 472/212 |
| 2013/0158195 A1* | 6/2013 | Chen | C08J 5/18 524/600 |
| 2014/0220335 A1* | 8/2014 | Lin | C09D 7/1216 428/327 |
| 2014/0227501 A1* | 8/2014 | Carney | C09D 179/08 428/220 |
| 2015/0018484 A1* | 1/2015 | Lin | C08J 5/18 524/600 |
| 2015/0030845 A1* | 1/2015 | Carney | C08K 5/3417 428/329 |

FOREIGN PATENT DOCUMENTS

| | | |
|---|---|---|
| JP | 2013-084684 | 5/2013 |
| JP | 2013095851 | 5/2013 |
| TW | 201311444 | 3/2013 |
| WO | WO 2010/126047 A1 * 11/2010 | .............. B32B 27/34 |

OTHER PUBLICATIONS

Office Action dated Jul. 3, 2014 for Taiwanese Patent Application No. 102138107.

* cited by examiner

POLYIMIDE FILM INCORPORATING POLYIMIDE POWDER DELUSTRANT, AND MANUFACTURE THEREOF

CROSS-REFERENCE TO RELATED APPLICATION

This application is a continuation-in-part application of U.S. patent application Ser. No. 13/600,293 filed on Aug. 31, 2012, which application claims priority to Taiwan Application No. 100146877 filed Dec. 16, 2011.

BACKGROUND

1. Field of the Invention

The present inventions relate to delustrants composed of polyimide powder, polyimide films incorporating the polyimide powder delustrant, and manufacture methods thereof.

2. Description of the Related Art

Polyimide films are widely used in electronic products. Owing to high surface flatness, the polyimide film may cause light reflection that may be uncomfortable to viewing and causes eyestrain during extensive use. This effect may be magnified in color films which can render the reflected light even more significant to the viewer.

In order to reduce the gloss of the polyimide film, some approach may incorporate a delustrant into the polyimide film to increase its surface roughness, so that incident light can be scattered. Conventional delustrants may include inorganic and organic compounds.

Examples of inorganic compounds used as delustrant can include silicon oxide, aluminum oxide, calcium carbonate, barium sulphate, titanium dioxide and the like. However, inorganic particles have a relatively high dielectric constant, which may confer poor insulation property to the film.

Examples of organic compounds used as delustrant can include polycarbonate (PC), polystyrene (PS), polymethylmethacrylate (PMMA), polyethylene, polypropylene, polyethylene terephthalate (PET), epoxy resin and the like. However, the organic compound cannot tolerate a temperature above 250° C., which is approximately the temperature at which chemical conversion occurs in the manufacture of the polyimide film. As a result, using organic compounds in the manufacture of the polyimide film may produce defects such as cracks or apertures, or form spots of non-uniform color due to uneven melting.

Therefore, there is a need for a polyimide film with desirable properties and low gloss, and address at least the aforementioned issues.

SUMMARY

The present application describes a low-gloss polyimide film having a 60° gloss value smaller or equal to about 5 on at least one outmost surface of the film. The polyimide film includes a polyimide layer including a polyimide base polymer, and a polyimide powder distributed in the polyimide base polymer, the polyimide powder being obtained by reacting a diamine with a dianhydride at a molar ratio of about 1:0.950 to about 1:0.995.

In some embodiments, the polyimide film has a multilayered structure including at least a second polyimide layer stacked on a surface of the polyimide layer. The second polyimide can also include the polyimide powder at a weight ratio less than about 20 wt % of the total weight of the second polyimide layer.

The present application also provides a method of preparing a polyimide film. The method includes forming a polyimide powder from a diamine and a dianhydride having a molar ratio of about 1:0.950 to about 1:0.995, performing condensation polymerization of monomers including diamine and dianhydride components to obtain a solution containing polyamic acid, adding the polyimide powder into the solution containing the polyamic acid, forming a precursor solution based on the solution containing the polyamic acid, coating a layer of the precursor solution on a support, and baking the coated layer to form a polyimide layer.

DETAILED DESCRIPTION OF THE EMBODIMENTS

The present application describes low-gloss polyimide films that include a polyimide base polymer forming a main molecular structure of the film, and a polyimide powder distributed in the polyimide base polymer. In some embodiments, the polyimide film can have a single-layer structure. In other embodiments, the polyimide film can have a multilayered structure.

The polyimide base polymer can be obtained by reacting diamine with dianhydride components, the molar ratio of the monomers of diamine and dianhydride being substantially equal to 1:1. One or more diamine component can be reacted with one or more dianhydride components to form the polyimide base polymer. Examples of diamine components can include, without limitation, phenylenediamine (PDA), 2-(4-aminophenyl)-5-amino benzimidazole (PBOA), 3,4'-oxydianiline (3,4'-ODA), 4,4'-oxydianiline (4,4'-ODA), p-phenylenediamine (p-PDA), 2,2'-bis(trifluoromethyl)benzidine (TFMB) and the like. Examples of dianhydride components can include, without limitation, pyromellitic dianhydride (PMDA), 3,3',4,4'-biphenyltetracarboxylic dianhydride (BPDA), 2,2-bis[4-(3,4-dicarboxyphenoxy)phenyl]propane dianhydride (BPADA) and the like.

By adding polyimide powder as a delustrant into the polyimide base polymer, uneven microstructures can be formed on the surface of the polyimide film, and/or light-scattering structures can be formed in the polyimide film. Accordingly, incident light can be effectively scattered to reduce gloss.

The polyimide powder used as a delustrant can have an average particle size or diameter between about 0.5 μm and about 15 μm. More specifically, the average particle size of the polyimide powder can be about 0.7 μm, 1 μm, 2 μm, 3 μm, 5 μm, 7 μm, 10 μm, 11 μm, 12 μm, 13 μm, or any intermediate values between these values. For example, the polyimide powder can have an average particle size between about 1 μm and about 12 μm, such as between 2 μm and 10 μm.

In some embodiment, the added amount of the polyimide powder can have a weight ratio between about 5 wt % and about 10 wt % of the total weight of the polyimide film. For example, the weight ratio of the polyimide powder can be about 5.5 wt %, 6 wt %, 7 wt %, 8 wt %, 9 wt %, 10 wt %, or a any intermediate values between these values.

The added amount and the average particle size of the polyimide powder can be selected according to the desired application of the film and/or the desired gloss value under an observation angle of about 60° (also called "60° gloss value"). For example, when the 60° gloss value has to be equal to about 25, the polyimide powder can be incorporated in an amount that is higher when the average particle size is smaller (such as 1 μm), and lower when the average particle size is greater (such as 12 μm).

In some embodiment, the polyimide film can have a 60° gloss value smaller or equal to about 50. For example, the 60° gloss value of the film can be between about 1 and about 50, such as about 1, 5, 10, 20, 25, 30, 35, 40, 45, 50, or any intermediate values between these values.

The polyimide powder can be obtained by reacting diamine with dianhydride components. One or more diamine components can be reacted with one or more dianhydride components to form the polyimide powder. Examples of diamine components can include, without limitation, PDA, PBOA, 3,4'-ODA, 4,4'-ODA, TFMB or any combination thereof. Examples of dianhydride components can include, without limitation, PMDA, BPDA, BPADA, or any combination thereof.

The low-gloss polyimide film can be transparent, and exhibit misted appearance with low gloss. In some embodiments, the polyimide film can also be a color film, such as red, blue, black, yellow and the like. Color pigments can be incorporated into the polyimide film to produce a desired color. The amount of pigment can be about 2 to about 10 wt % of the weight of the film.

The pigment can be a black pigment formed by carbon micro-particles, a chrome black pigment, a titanium black pigment and the like. Examples of color pigments can include carbon black, titanium black, bone black, cyanine black, acetylene black, lamp black, graphite, iron oxide black, iron black, aniline black, cyanine black and the like, which can be used individually or in combination.

In one embodiment, a black polyimide film exhibiting an increased shading rate can be formed by incorporating carbon black, titanium black or a combination thereof. In a variant embodiment, a carbon black pigment having an average particle size between about 0.1 μm and about 1.5 μm can also be used.

When a black polyimide film is formed by incorporating a polyimide powder delustrant with an average particle size higher than 10 μm or in an amount more than 10 wt %, it may be observed that the depth of the black color may be reduced and/or the film may whiten owing to the presence of white spots. Moreover, the black color of the film may be unstable in large-scale manufacture, resulting in films that have non-uniform color. In attempt to alleviate the foregoing issues, an embodiment of a black polyimide film having a 60° gloss value smaller or equal to about 50 can incorporate about 80 wt % to about 93 wt % of a polyimide base polymer, about 2 wt % to about 10 wt % of a black pigment, and about 5 wt % to about 10 wt % of a polyimide powder having an average particle size between about 2 μm and about 10 μm.

The polyimide film can be obtained by condensation polymerization of monomers including a diamine and a dianhydride. The molar ratio of diamine to dianhydride is substantially equal to 1:1, for example, 0.90:1.10 or 0.98:1.02.

The diamine and dianhydride components can be first reacted in the presence of a solvent to obtain a polyamic acid solution. The solvent can be a non-protonic polar solvent with a relatively low boiling point (e.g., below about 225° C.), so that the solvent can be removed at a relatively low temperature. Suitable solvents can include, without limitation, dimethylacetamide (DMAC), N,N'-dimethyl-formamide (DMF) and the like.

A polyimide powder delustrant, a dehydrant and a catalyst then can be incorporated into the polyamic acid solution, which is agitated to obtain a homogeneous precursor solution. Examples of the dehydrant can include, without limitation, aliphatic acid anhydrides (such as acetic anhydride and propionic anhydride) and aromatic acid anhydrides (such as benzoic anhydride and phthalic anhydride), which can be used individually or in combination. In one embodiment, a preferable dehydrant can be acetic anhydride, and the amount can be between about 2 and 3 moles per equivalent of the polyamic acid.

Examples of the catalyst can include, without limitation, heterocyclic tertiary amines (such as picoline, pyridine, lutidine, quinoilne, isoquinoilne, cinnoline, phthalazine, quinazoline, imidazole, N-methyl-2-pyrrolidone, N-ethyl-2-pyrrolidone, N-methyl piperidine, N-ethyl piperidine and the like), aliphatic tertiary amines (such as triethylamine (TEA), tripropylamine, tributylamine, triethanolamine, N,N-dimethylethanolamine, triethylenediamine, and N,N-diisopropylethylamine (DIPEA)), and aromatic tertiary amines (such as dimethylaniline), which can be used individually or in combination. In one embodiment, a preferable catalyst is picoline (such as α-picoline, β-picoline or γ-picoline). The polyamic acid-dehydrant-catalyst molar ratio can be about 1:2:1, i.e., about 2 mole of dehydrant and about 1 mole of catalyst are used for one mole of polyamic acid. If needed, a color pigment such as carbon black can be added in any of the aforementioned steps. The pigment can be mixed with the diamine and dianhydride components at the beginning of the condensation polymerization, or added after incorporation of the delustrant, the dehydrant or the catalyst.

Other additives can also be incorporated into the solution containing polyamic acid to confer desired properties to the polyimide film. For example, suitable additives can include, without limitation, processing aid, antioxidant, light stabilizer, flame retardant additive, anti-static agent, heat stabilizer, ultraviolet light absorbing agent and reinforcing agent, which can be used individually or in combination.

A layer of the precursor solution then can be coated on a glass or stainless plate support. The coated layer can be baked to form a low-gloss polyimide film, which can be subsequently peeled from the glass plate support. A suitable temperature range for baking is between about 90° C. and about 350° C. The formed polyimide film can have a thickness between about 3 μm and about 150 μm, for example between about 3 μm and 75 μm, such as between about 5 μm and about 50 μm.

The polyimide powder delustrant can be obtained by condensation polymerization of a diamine monomer and a dianhydride monomer. In order to obtain a stable and desired average particle diameter, the molar ratio of diamine to dianhydride can be about 1:0.950 to 1:0.995.

Diamine and dianhydride (such as 4,4'-ODA and PMDA) components with the above molar ratio can be homogeneously mixed in a solvent to form a reaction solution. Suitable solvents can include DMAC, DMF and the like. The total amount of the monomers containing diamine and dianhydride can be between about 2 wt % and about 20 wt % of the total weight of the reaction solution. In one embodiment, the weight ratio of the monomers can be between about 5 wt % and about 15 wt % of the total weight of the reaction solution.

A dehydrant and a catalyst then can be incorporated into the reaction solution, which is agitated to obtain a reaction mixture. The dehydrant and the catalyst for preparing the polyimide powder can be similar to those used for manufacturing the polyimide film.

The reaction mixture can be heated to obtain a precipitate of polyimide forming the delustrant. The precipitate of polyimide then can be rinsed, filtrated and dried.

Owing to its excellent heat resistance, the polyimide powder delustrant can maintain stable properties during chemical conversion under a temperature range between 250° C. and 500° C. As a result, non-uniform color defects induced by color spots during the manufacture of the polyimide film can be prevented. Compared to inorganic delustrants, the polyimide powder delustrant can provide better color rendering, and higher insulating properties by lowering the dielectric constant of the film, which makes it particularly suitable for applications with high insulation requirements.

In some embodiments, the low-gloss polyimide film can have a multilayered structure including a plurality of polyimide layers stacked on one another. The used diamine and dianhydride monomers can be the same or different among the layers. The multilayered polyimide film can include, e.g., two layers, three layers or more. The multilayered film has a 60° gloss value smaller or equal to about 5 on at least one outmost surface of the multilayered film.

In the multilayered film, each layer includes a polyimide base polymer, and at least one layer includes a polyimide powder as a delustrant distributed in the polyimide base polymer. Preferably, the layer including the delustrant is the outmost layer of the multilayered film. The polyimide powder can have a weight ratio between about 20 and about 50 wt % of the total weight of the layer. The amount of the polyimide powder is defined relative to the weight of the layer in which it is incorporated. In some embodiments, the weight ratio of the polyimide powder can be 20, 21, 24, 25, 30, 35, 40, 45, 47, 49, 50 wt %, or any intermediate values between the aforementioned values. For example, when the multilayered film contains a first and a second layer stacked on each other, the polyimide powder in the first layer may have a weight ratio between about 20-50 wt %, and the second layer may have no polyimide power or may contain polyimide powder with a weight ratio less than about 20 wt % of the total weight of the second layer.

In certain embodiments of the multilayered polyimide film, at least one of the polyimide layers may further include a color pigment. The color pigment may be like previously described, e.g., carbon black. In one embodiment, the color pigment incorporated in one layer can have a weight ratio between about 4 and about 9 wt % of the total weight of the layer. For example, the weight ratio of the color pigment can be 4, 4.1, 4.3, 4.5, 5, 5.5, 6, 6.5, 7, 8, 8.5, 8.8, 8.9, 9 wt %, or any intermediate values between the aforementioned values.

In one example of implementation, a double-layer polyimide film can be fabricated, which includes a first and a second layer containing a polyimide base polymer that are stacked on each other. One or both of the first and second layers can include color pigment such as carbon black. Moreover, one of the first and second layers in the multilayered polyimide film, e.g., the first layer, can further include a polyimide powder in an amount of about 20 to about 50 wt % of the total weight of that layer. For example, the weight ratio of the polyimide powder may be 20, 21, 24, 25, 30, 35, 40, 45, 47, 49, 50 wt %, or any intermediate values between the aforementioned values. The second layer contains no polyimide powder, or may contain an amount of polyimide powder less than the first layer. In some embodiments, the amount of polyimide powder incorporated in the second layer can be less than or equal to about 20 wt % of the total weight of the second layer, such as 19, 18, 17, 15, 10, 8, 5, 3, 2, 1, 0.5, 0.1 wt %, or any intermediate values between the aforementioned values.

In another embodiment, a triple-layer polyimide film can be fabricated, which includes a first layer, a second layer and a third layer stacked on one another, the second layer being sandwiched between the first and the third layers. Each layer of the triple-layer polyimide film includes a polyimide base polymer, and at least one of the three layers includes a color pigment such as carbon black. Moreover, one or both of the first and the third layer can further include polyimide powder in an amount between about 20 and about 50 wt % of the total weight of that layer. The second layer contains no polyimide powder, or may contain polyimide powder in a reduced amount that does not affect the mechanical properties (e.g., an excessively low elongation rate) of the triple-layer polyimide film.

Examples for fabricating the polyimide powder delustrant and the low-gloss films are described hereafter.

EXAMPLES

Preparation of the Polyimide Powder

The particle size can determine the extinction effect of the polyimide powder applied as a delustrant. Polyimide powder prepared by conventional methods cannot be used as effective delustrant owing to a wide distribution of the particle size. Some embodiments of fabricating processes described herein can apply specific molar ratios of monomers and solid content to accurately control the average particle size of the polyimide powder.

Example 1-1

About 570 g of DMAC solvent can be added into a three-necked flask. Then, about 14.35 g of 4,4'-ODA and about 14.86 g of PMDA can be incorporated into the DMAC solvent and agitated to completely dissolve into the reaction solution. The molar ratio of 4,4'-ODA and PMDA can be about 1:0.950, and a total weight ratio of the monomers can be about 5 wt % of the weight of the reaction solution. About 3.17 g of 3-picoline then can be added into the reaction solution, which is continuously agitated and heated at about 170° C. for 18 hours to form a precipitate of polyimide. The precipitate can be rinsed by water and ethanol, undergo vacuum filtration, and then heated at about 160° C. in a baking oven for 1 hour to obtain the polyimide powder.

Example 1-2

A polyimide powder can be prepared like in Example 1-1 except that the applied amounts include about 540 g of DMAC, about 28.70 g of 4,4'-ODA, about 29.72 g of PMDA, and about 6.34 g of 3-picoline. Accordingly, a total weight ratio of the monomers can be about 10 wt % of the weight of the reaction solution.

Example 1-3

A polyimide powder can be prepared like in Example 1-1 except that the applied amounts include about 510 g of DMAC, about 43.05 g of 4,4'-ODA, about 44.58 g of PMDA, and about 9.51 g of 3-picoline. Accordingly, a total weight ratio of the monomers can be about 15 wt % of the weight of the reaction solution.

Example 1-4

A polyimide powder can be prepared like in Example 1-1 except that the applied amounts include about 15.41 g of PMDA, and about 3.29 g of 3-picoline. Accordingly, the molar ratio of 4,4'-ODA to PMDA can be about 1:0.985, and a total weight ratio of the monomers can be about 5 wt % of the weight of the reaction solution.

Example 1-5

A polyimide powder can be prepared like in Example 1-4 except that the applied amounts include about 540 g of DMAC, about 28.70 g of 4,4'-ODA, about 30.81 g of PMDA, and about 6.57 g of 3-picoline. Accordingly, a total weight ratio of the monomers can be about 10 wt % of the weight of the reaction solution.

Example 1-6

A polyimide powder can be prepared like in Example 1-4 except that the applied amounts include about 510 g of DMAC, about 43.05 g of 4,4'-ODA, about 46.22 g of PMDA, and about 9.86 g of 3-picoline. Accordingly, a total weight ratio of the monomers can be about 15 wt % of the weight of the reaction solution.

Example 1-7

A polyimide powder can be prepared like in Example 1-1 except that the applied amounts include about 15.57 g of PMDA, and about 3.32 g of 3-picoline. Accordingly, the molar ratio of 4,4'-ODA to PMDA can be about 1:0.995, and a total weight ratio of the monomers can be about 5 wt % of the weight of the reaction solution.

Example 1-8

A polyimide powder can be prepared like in Example 1-7 except that the applied amounts include about 540 g of DMAC, about 28.70 g of 4,4'-ODA, about 31.14 g of PMDA, and about 6.64 g of 3-picoline. Accordingly, a total weight ratio of the monomers can be about 10 wt % of the weight of the reaction solution.

Example 1-9

A polyimide powder can be prepared like in Example 1-7 except that the applied amounts include about 510 g of DMAC, about 43.05 g of 4,4'-ODA, about 46.70 g of PMDA, and about 9.96 g of 3-picoline. Accordingly, a total weight ratio of the monomers can be about 15 wt % of the weight of the reaction solution.

Comparative Example 1-1

A polyimide powder can be prepared like in Example 1-1 except that the applied amounts include about 570 g of DMAC, about 14.35 g of 4,4'-ODA, about 14.08 g of PMDA, and about 6.01 g of 3-picoline. Accordingly, the molar ratio of 4,4'-ODA to PMDA is about 1:0.900, and a total weight ratio of the monomers can be about 5 wt % of the weight of the reaction solution.

Comparative Example 1-2

A polyimide powder can be prepared like in Comparative Example 1-1 except that the applied amounts include about 510 g of DMAC, about 43.05 g of 4,4'-ODA, about 42.23 g of PMDA, and about 18.02 g of 3-picoline. Accordingly, a total weight ratio of the monomers can be about 15 wt % of the weight of the reaction solution.

Comparative Example 1-3

A polyimide powder can be prepared like in Example 1-1 except that the applied amounts include about 576 g of DMAC, about 11.48 g of 4,4'-ODA, about 11.89 g of PMDA, and about 5.07 g of 3-picoline. Accordingly, the molar ratio of 4,4'-ODA to PMDA is about 1:0.950, and a total weight ratio of the monomers can be about 4 wt % of the weight of the reaction solution.

Comparative Example 1-4

A polyimide powder can be prepared like in Comparative Example 1-3 except that the applied amounts include about 504 g of DMAC, about 45.93 g of 4,4'-ODA, about 47.56 g of PMDA, and about 20.29 g of 3-picoline. Accordingly, a total weight ratio of the monomers can be about 16 wt % of the weight of the reaction solution.

Comparative Example 1-5

A polyimide powder can be prepared like in Example 1-1 except that the applied amounts include about 576 g of DMAC, about 11.48 g of 4,4'-ODA, about 12.45 g of PMDA, and about 5.31 g of 3-picoline. Accordingly, the molar ratio of 4,4'-ODA to PMDA is about 1:0.995, and a weight ratio of the monomers can be about 4 wt % of the weight of the reaction solution.

Comparative Example 1-6

A polyimide powder can be prepared like in Comparative Example 1-5 except that the applied amounts include about 504 g of DMAC, about 45.93 g of 4,4'-ODA, about 49.81 g of PMDA, and about 21.25 g of 3-picoline. Accordingly, a total weight ratio of the monomers can be about 16 wt % of the weight of the reaction solution.

Comparative Example 1-7

A polyimide powder can be prepared like in Example 1-1 except that the applied amounts include about 570 g of DMAC, about 14.35 g of 4,4'-ODA, about 15.65 g of PMDA, and about 6.67 g of 3-picoline. Accordingly, the molar ratio of 4,4'-ODA to PMDA is about 1:1, and a total weight ratio of the monomers can be about 5 wt % of the weight of the reaction solution.

Comparative Example 1-8

A polyimide powder can be prepared like in Comparative Example 1-7 except that the applied amounts include about 510 g of DMAC, about 43.05 g of 4,4'-ODA, about 46.95 g of PMDA, and about 20.02 g of 3-picoline. Accordingly, a total weight ratio of the monomers can be about 15 wt % of the weight of the reaction solution. The reaction solution can be continuously agitated and heated at about 170° C. for 18 hours, but no precipitate of polyimide is formed. In other words, no polyimide powder can be formed.

Testing of the Polyimide Powder

The polyimide powders obtained from the above examples and comparative examples can be tested to determine the distribution of the particle size.

A particle size analyzer (Horiba LA-950, sold by Horiba, Instruments) can be used to measure the particle sizes. The polyimide powder can be dispersed in a flow carrier DMAC, and dispersed through a grinder. The particle sizes measured from the polyimide powder can be verified by SEM. The results are shown in Table 1 below.

TABLE 1

|  | Solid Content (%) | Molar ratio (diamine:dianhydride) | $D_{50}$ (μm) | $D_{90}$ (μm) | Effective Particle Size (%) |
|---|---|---|---|---|---|
| Example 1-1 | 5 | 1:0.950 | 2.7 | 5.9 | 70.6 |
| Example 1-2 | 10 | 1:0.950 | 2.8 | 6.0 | 73.1 |
| Example 1-3 | 15 | 1:0.950 | 3.0 | 6.3 | 77.9 |
| Example 1-4 | 5 | 1:0.985 | 3.4 | 6.0 | 73.8 |
| Example 1-5 | 10 | 1:0.985 | 3.7 | 6.6 | 75.5 |
| Example 1-6 | 15 | 1:0.985 | 4.2 | 7.0 | 91.6 |
| Example 1-7 | 5 | 1:0.995 | 3.3 | 6.7 | 79.1 |
| Example 1-8 | 10 | 1:0.995 | 4.5 | 6.9 | 82.5 |
| Example 1-9 | 15 | 1:0.995 | 6.5 | 9.7 | 92.5 |
| Comparative Example 1-1 | 5 | 1:0.900 | 0.5 | 2.7 | 13.7 |
| Comparative Example 1-2 | 15 | 1:0.900 | 1.4 | 3.9 | 14.1 |
| Comparative Example 1-3 | 4 | 1:0.950 | 2.6 | 5.8 | 67.9 |
| Comparative Example 1-4 | 16 | 1:0.950 | 3.1 | 7.5 | 67.3 |
| Comparative Example 1-5 | 4 | 1:0.995 | 3.3 | 6.7 | 68.7 |
| Comparative Example 1-6 | 16 | 1:0.995 | 6.7 | 10.9 | 56.5 |
| Comparative Example 1-7 | 5 | 1:1 | 3.5 | 12.3 | 68.4 |
| Comparative Example 1-8 | 15 | 1:1 | — | — | No powder formation |

In Table 1, "solid content" means the weight percentage of the monomers in the reaction solution; "D50" is the median diameter, i.e., it is the particle size for which the cumulative distribution percentage reaches 50% (there are 50% of particles with a size higher than the value D50, and 50% smaller than the value D50); "D90" is the particle size for which the cumulative distribution percentage reaches 90% (there are 90% of particles with a size higher than the value D90), which is used as a particle size index to represent larger particle of the powder; and the "effective particle size (S)" is defined as $S=B/(A+B+C)\times 100\%$, wherein A is the amount percentage of particles in the polyimide powder having a size smaller than 2 μm, B is the amount percentage of particles in the polyimide powder having diameter between 2-10 μm, and C is the amount percentage of particles in the polyimide powder having a size larger than 10 μm.

Figure 1:
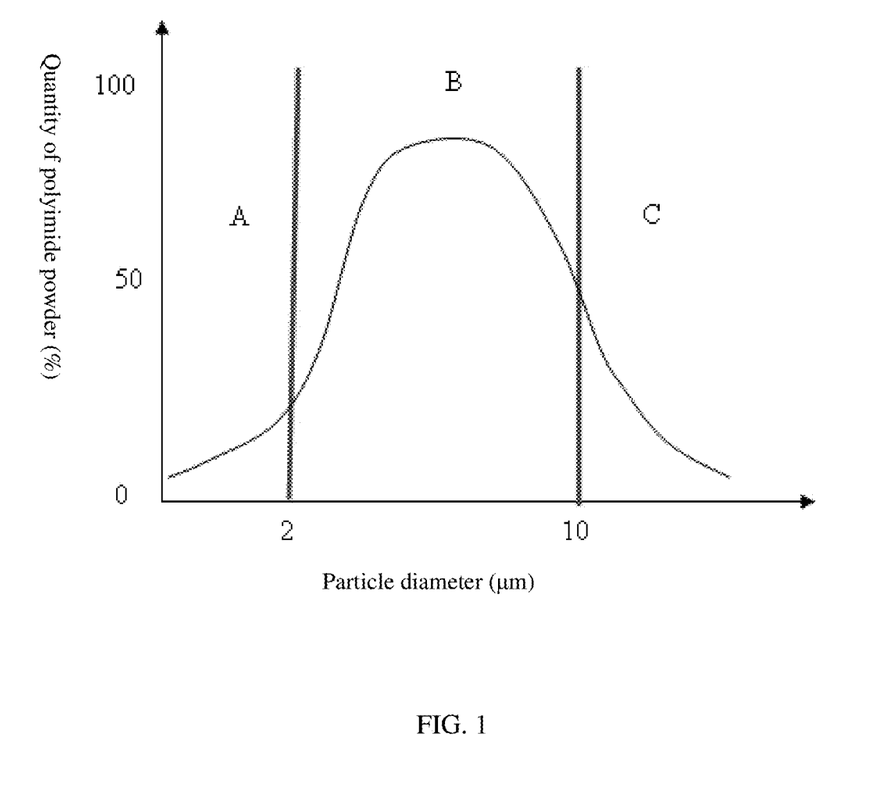
FIG. 1 is a graph plotting a particle size distribution of a polyimide powder prepared according to one embodiment.

FIG. 1 is a graph plotting a distribution of particle size in the polyimide powder.

Referring to FIG. 1 and Table 1, in Examples 1-1 to 1-9 where the molar ratio of 4,4'-ODA to PMDA is between about 0.95 and about 0.995 and the monomer solid content has a weight ratio between about 5 wt % and about 15 wt % of the reaction solution, the value D50 of the polyimide powder is between about 2.7 μm and about 4.9 μm, the value D90 is between about 5.9 μm and about 7.3 μm, and the effective particle size (S) is higher than 70%.

In contrast, with Comparative Examples 1-1, 1-2, 1-7 and 1-8 where the molar ratio is lower than 0.95 or higher than 0.995 and the solid content is 5 wt % or 15 wt %, the effective particle size (S) cannot reach 70%, or even no particle can be formed. In addition, in Comparative Examples 1-3 to 1-6 where the molar ratio is within the range of 0.95-0.995 and the solid content is either lower than 5 wt % or exceeds 15 wt %, the effective particle size (S) still cannot reach 70%.

Accordingly, controlling the molar ratio of diamine to dianhydride between about 1:0.95 and about 1:0.995 and the solid content between about 5 wt % and about 15 wt % can allow to obtain an effective particle size (S) that is as high as 70% or even above.

Preparation of a Single-Layer Black Polyimide Film

Step 1. Preparation of the Polyimide Powder

About 14.35 g of 4,4'-ODA, about 14.86 g of PMDA, and about 570 g of DMAC can be mixed into a three-necked flask to obtain a reaction solution. The molar ratio of 4,4'-ODA to PMDA is about 1:0.950, and a total weight ratio of the monomers can be about 5 wt % of the reaction solution. About 3.35 g of 3-picoline then can be added into the reaction solution, which is continuously agitated and heated at the temperature of 170° C. for 18 hours to form a precipitate of polyimide. The precipitate can be rinsed by water and ethanol, undergo vacuum filtration, and heated at a temperature of 160° C. for 1 hour, and about 26.7 g of polyimide powder can be thereby obtained.

Step 2. Preparation of a Carbon Black Slurry

About 500 g of carbon black (Regal-R400, sold by CABOT Company) and about 4,000 g of DMAC can be mixed and agitated for 15 minutes. The mixture then can be processed through a grinder to obtain a carbon black slurry.

Step 3. Preparation of the Black Polyamic Acid (PAA) Solution

About 45 g of the carbon black slurry, about 833 g of a polyamic acid solution having 18 wt % of solid content and formed from polymerization of 4,4'-ODA, para-phenylenediamine (p-PDA) and PMDA with a viscosity of about 150,000 cps, and about 122 g of DMAC as solvent can be mixed homogeneously to obtain a black PAA solution having a weight of about 1,000 g with a solid content equal to about 15.49 wt %.

Step 4. Preparation of the Black Polyimide Film

Example 3-1

About 0.37 g of the polyimide powder (particle size equal to about 2.1 μm) obtained from Step 1, about 49.83 g of the black PAA solution obtained from Step 3, and about 15.2 g of DMAC can be added into a flask and agitated for 1~2 hours to obtain a low-gloss black PAA solution. The low-gloss black PAA solution can be coated on a glass plate support and baked in an oven. The baking condition can be set at a temperature of 90° C. for 30 minutes to remove most solvent, and then 170° C.-350° C. for 4 hours to form a single-layer low-gloss black polyimide film. The film peeled from the glass plate support can contain 5 wt % of polyimide powder with an average particle size equal to about 2.1 μm.

Example 3-2

A film is prepared like in Example 3-1 except that the solid content of the monomers 4,4'-ODA and PMDA is about 15 wt %, and the average particle size of the polyimide powder is about 5.5 μm.

Example 3-3

A film can be prepared like in Example 3-1 except that the solid content of the monomers 4,4'-ODA and PMDA is about 15 wt %, the molar ratio of 4,4'-ODA to PMDA is about 1:0.995, and the average particle size of the polyimide powder is about 8.6 µm.

Example 3-4

A film can be prepared like in Example 3-1 except that the added amount of polyimide powder is about 0.78 g. Accordingly, the low-gloss black polyimide film can contain about 10 wt % of the polyimide powder with an average particle size equal to about 2.1 µm.

Example 3-5

A film can be prepared like in Example 3-2 except that the added amount of polyimide powder is about 0.78 g. The polyimide powder has an average particle size equal to about 5.5 µm.

Example 3-6

A film can be prepared like in Example 3-3 except that the added amount of polyimide powder is about 0.78 g. The polyimide powder has an average particle size equal to about 8.6 µm.

Comparative Example 3-1

A film can be prepared like in Example 3-1 except that the added amount of polyimide powder is about 0.008 g with a particle size of about 2.1 µm. Accordingly, the low-gloss black polyimide film contains about 1 wt % of the polyimide powder.

Comparative Example 3-2

A film can be prepared like in Comparative Example 3-1 except that the solid content of the monomers 4,4'-ODA and PMDA is about 15 wt %, and the average particle size of the polyimide powder is about 5.5 µm.

Comparative Example 3-3

A film can be prepared like in Comparative Example 3-1 except that the solid content of the monomers 4,4'-ODA and PMDA is about 15 wt %, the molar ratio of 4,4'-ODA to PMDA is about 1:0.995, and the average particle size of the polyimide powder is about 8.6 µm.

Comparative Example 3-4

A film can be prepared like in Example 3-1 except that no polyimide powder is added.

Comparative Example 3-5

A film can be prepared like in Example 3-7 except that no polyimide powder is added, and about 0.37 g of $SiO_2$ powder with a particle size of about 5.2 µm (sold by GRACE Company under the product designation "P405") is used as delustrant.

Comparative Example 3-6

A film can be prepared like in Example 3-7 except that no polyimide powder is added, and about 0.37 g of $Al_2O_3$ powder with a particle size of about 5.4 µm (sold by Denka Company under the product designation "ASFP-20") is used as delustrant.

Testing of Optical Properties of the Black Polyimide Film

The 60° gloss value and the total transparency of the black polyimide film prepared according to the aforementioned examples and comparative examples can be measured, the results of which are shown in Table 2.

TABLE 2

Optical properties of the black polyimide film

| | Delustrant | | | Black polyimide film | |
| --- | --- | --- | --- | --- | --- |
| | Type | Content (wt %) | Average particle size (µm) | 60° gloss value | Total transparency (%) |
| Example 3-1 | polyimide powder | 5 | 2.1 | 48 | 0.01 |
| Example 3-2 | polyimide powder | 5 | 5.5 | 37 | 0.01 |
| Example 3-3 | polyimide powder | 5 | 8.6 | 27 | 0.04 |
| Example 3-4 | polyimide powder | 10 | 2.1 | 19 | 0.08 |
| Example 3-5 | polyimide powder | 10 | 5.5 | 15 | 0.02 |
| Example 3-6 | polyimide powder | 10 | 8.6 | 14 | 0.11 |
| Comparative Example 3-1 | polyimide powder | 1 | 2.1 | 129 | 0.01 |
| Comparative Example 3-2 | polyimide powder | 1 | 5.5 | 117 | 0.12 |
| Comparative Example 3-3 | polyimide powder | 1 | 8.6 | 102 | 0.01 |
| Comparative Example 3-4 | None | 0 | — | 125 | 0.01 |
| Comparative Example 3-5 | $SiO_2$ | 5 | 5.2 | 33 | 0.01 |
| Comparative Example 3-6 | $Al_2O_3$ | 5 | 5.4 | 77 | 0.01 |

The gloss meter sold under the designation NIPPON DEMSHOKU PG-1M can be used to measure the 60° gloss value, which can be obtained as an average of three to six measures. The haze meter sold under the designation NIPPON DEMSHOKU NDH 2000 can be used to measure the total transparency, which can be obtained as an average of three to six measures.

As shown in Table 2, compared to a black polyimide film formed without addition of delustrant (e.g., Comparative Example 3-4), the low-gloss black polyimide film incorporating the polyimide powder delustrant can have a lower 60° gloss value, and can exhibit high shading rate (i.e., lower than 0.1% of the total transparency). In particular, as shown in Examples 3-1 to 3-6, the 60° gloss value can be reduced below 50 when 5 wt % or more of the polyimide powder is incorporated. The 60° gloss value can be reduced as more of the polyimide powder is added. Compared to the conventional delustrants used in Comparative Examples 3-5 and 3-6, the use of the polyimide powder as delustrant can yield equal or even better extinction effects.

When the added amount of polyimide powder is lower than 5 wt % (which is the case for Comparative Example 1-3), the 60° gloss value of the film can still be higher than 100, even when the average particle size of the polyimide powder is between 2 µm and 10 µm. Moreover, when the amount of the polyimide powder is lower than 5 wt %, the 60° gloss value of the film can also be higher than 100 even if the average particle size is larger than 10 μm (not shown in the table).

Using a polyimide powder with excessively small particle sizes (e.g., smaller than 0.5 μm) may reduce the surface roughness of the film, which may result in insufficient scattering of incident light. If a larger amount of the polyimide powder were used for obtaining the desired 60° gloss value, the dispersion of the powder particles may be reduced and/or the properties of the film may even be affected.

On the other hand, polyimide powder with an excessively large particle size may produce a coarser film surface, especially in thinner films (e.g., lower than 80 μm in thickness), which may affect the surface evenness. Moreover, the bigger particles of the polyimide powder may easily detach and contaminate following processing.

Preparation of the Low Gloss Polyimide Film

Example 5-1

About 6.1 g of the polyimide powder (particle size about 5 μm) and about 160.6 g of DMAC can be mixed into a flask. About 333.3 g of a PAA solution of a solid content equal to about 18 wt % (polymerized from 4,4'-ODA, p-PDA and PMDA having a viscosity of about 150,000 cps) then can be added and continuously agitated, until a PAA solution having a total weight of 500 g with a solid content of the monomers equal to about 13.2 wt % can be obtained. About 60 g of the PAA solution then can be blade coated on a glass plate support and baked in an oven. The baking condition can include heating at a temperature of about 90° C. for 30 minutes to remove most solvent, and then at 170° C.-350° C. for 4 hours to form a single-layer low-gloss polyimide film containing about 10 wt % of the polyimide powder.

Comparative Example 5-1

A film can be prepared like in Example 5-1 except that no polyimide powder is added, and about 10 wt % of $Al_2O_3$ powder with a particle size of about 5.4 μm (sold by Denka Company under the designation "ASFP-20") is incorporated as delustrant.

Comparative Example 5-2

A film can be prepared like in Example 5-1 except that no polyimide powder is added, and about 10 wt % of $SiO_2$ powder with a particle size of about 5.2 μm (sold by GRACE Company under the designation "P405") is incorporated as delustrant.

Comparative Example 5-3

A film can be prepared like in Example 5-1 except that no polyimide powder is added, and about 10 wt % of $TiO_2$ powder with a particle size of about 5 μm (sold by Sigma Aldrich Company) is incorporated as delustrant.

Measure of the Dielectric Constant of the Polyimide Film

The ASTM D150-95 standard test can be used to measure the dielectric constant of the polyimide films fabricated according to the above examples and comparative examples. Impedance analyzer Agilent 4294A (clip type 16034G) can be used to determine the dielectric constant of each film, which can be an average of three measures. The results are shown in Table 3.

TABLE 3

Test results of dielectric constant of polyimide film with low gloss

|  | Delustrant | Dielectric Constant |
|---|---|---|
| Example 5-1 | polyimide powder | 3.60 |
| Comparative Example 5-1 | $Al_2O_3$ | 3.88 |
| Comparative Example 5-2 | $SiO_2$ | 3.73 |
| Comparative Example 5-3 | $TiO_2$ | 5.60 |

As shown in Table 3, compared to conventional inorganic delustrants, incorporating a suitable amount of polyimide powder can allow to form a film with a lower dielectric constant and better insulation properties, which makes it particularly suitable for applications with high insulation requirement.

Preparation of a Multilayered Black Polyimide Film

Example 6-1

Step 1: Preparation of the Polyimide Powder

About 470 g of DMAC solvent can be added into a three-necked flask. Then, about 14.35 g of 4,4'-ODA and about 15.65 g of PMDA can be incorporated into the DMAC solvent and agitated to completely dissolve into the reaction solution. The molar ratio of 4,4'-ODA and PMDA can be about 1:1, and a total weight ratio of the monomers can be about 6 wt % of the weight of the reaction solution. About 500 g of the reaction solution is continuously agitated, gradually heated to about 160° C. by 2° C./min, and heated at 160° C. for 3 hours to form a precipitate of polyimide. The precipitate can be rinsed by DMAC and ethanol, undergo vacuum filtration, and then heated at about 160° C. in a baking oven for 1 hour to obtain the polyimide powder.

Step 2: Preparation of Polyamic Acid (PAA) Solutions

Assume that a black double-layer polyimide film is to be fabricated, two black PAA solutions can be respectively prepared for the two polyimide layers of the film. With respect to the first black PAA solution, a polyamic acid solution having 18 wt % of solid content can be formed from polymerization of 4,4'-ODA and PMDA (molar ratio 1:1). Moreover, about 4 g of carbon black (SB4A, sold by Degussa Company), about 20 g of the polyimide powder prepared by the aforementioned Step 1, and about 144 g of DMAC can be mixed and agitated for 60 minutes, and then processed through a grinder. Subsequently, the resulting mixture can be mixed homogeneously with about 496 g of the polyamic acid solution to obtain the first black PAA solution.

With respect to the second black PAA solution, a similar polyamic acid solution having 18 wt % of solid content can be formed from polymerization of 4,4'-ODA and PMDA (molar ratio 1:1). Moreover, about 4 g of carbon black (SB4A, sold by Degussa Company) and about 24 g of DMAC can be mixed and agitated for 60 minutes, and then processed through a grinder. The resulting mixture can be mixed homogeneously with about 593 g of the polyamic acid solution to obtain the second black PAA solution.

Step 3: Preparation of the Multilayered Polyimide Film

The second black PAA solution is coated on a glass plate support and baked at a temperature of about 80° C. for 30 minutes to remove most solvent. Then the first black PAA solution is coated on the second layer, baked at a temperature of about 80° C. for 30 minutes to remove most solvent, and then at 350° C. for 4 hours to form a double-layer polyimide film. The total thickness of the double-layer polyimide film is about 13 µm, the thickness of the first layer being 4 µm and the thickness of the second layer being 9 µm.

Example 6-2

A double-layer film can be prepared like in Example 6-1 except that the first black PAA solution contains about 4 g of carbon black (SB4A), about 30 g of the polyimide powder, about 204 g of DMAC, and about 407 g of the polyamic acid solution.

Example 6-3

A double-layer film can be prepared like in Example 6-1 except that the first black PAA solution contains about 4 g of carbon black (SB4A), about 50 g of the polyimide powder, about 324 g of DMAC, and about 284 g of the polyamic acid solution.

Example 6-4

A triple-layer film can be fabricated based on the double-layer structure obtained in Example 6-1. More specifically, the double-layer structure obtained in Example 6-1 can be peeled from the glass plate support, and then arranged so that the second layer is on the top while the first layer lies in contact with the glass plate support. Then the first black PAA solution is coated on the second layer for forming a third layer. This structure is baked at a temperature of about 80° C. for 30 minutes to remove most solvent, and then at 350° C. for 4 hours to form the triple-layer polyimide film. In this triple-layer structure, the first and the third layers are identical in composition, and the second layer is sandwiched between the first and the third layers. Moreover, the total thickness of the triple-layer polyimide film is 13 µm, the thickness of the first, second and third layer being respectively 4 µm, 5 µm and 4 µm.

Example 6-5

A triple-layer film can be prepared like in Example 6-4 except that the first black PAA solution contains about 4 g of carbon black (SB4A), about 50 g of the polyimide powder, about 324 g of DMAC, and about 284 g of the polyamic acid solution.

Example 6-6

A double-layer film can be prepared like in Example 6-1 except that the first black PAA solution contains about 6 g of carbon black (SB4A), about 20 g of the polyimide powder, about 156 g of DMAC, and about 457 g of the polyamic acid solution. Moreover, the second black PAA solution contains about 6 g of carbon black (SB4A), about 36 g of DMAC, and about 580 g of the polyamic acid solution.

Example 6-7

Step 1: Preparation of the Polyimide Powder

The polyimide powder can be prepared like in Example 6-1.

Step 2: Preparation of Polyamic Acid (PAA) Solutions

The first black PAA solution can be prepare like in Example 6-1.
The second black PAA solution can be prepared like in Example 6-1 except that the incorporated components include about 4 g of carbon black (SB4A), about 3 g of the polyimide powder, about 42 g of DMAC, and about 574 g of the polyamic acid solution.

Step 3: Preparation of the Multilayered Polyimide Film

The second black PAA solution is coated on a glass plate support and baked at a temperature of about 80° C. for 30 minutes to remove most solvent, and then at 370° C. for 4 hours to form the second layer. The second layer is peeled from the support, and reversed to expose the surface that was previously in contact with the plate support. Then the first black PAA solution is coated on the exposed surface of the second layer, baked at a temperature of about 80° C. for 30 minutes to remove most solvent, and then at 370° C. for 4 hours to form a double-layer polyimide film. The total thickness of the double-layer polyimide film is about 13 µm, the thickness of the first and second layer being respectively 4 µm and 9 µm.

Example 6-8

A double-layer film can be prepared like in Example 6-7 except that the second black PAA solution contains about 4 g of carbon black (SB4A), about 10 g of the polyimide powder, about 84 g of DMAC, and about 531 g of the polyamic acid solution.

Example 6-9

A double-layer film can be prepared like in Example 6-7 except that the second black PAA solution contains about 4 g of carbon black (SB4A), about 20 g of the polyimide powder, about 144 g of DMAC, and about 469 g of the polyamic acid solution.

Example 6-10

A double-layer film can be prepared like in Example 6-7 except that the second black PAA solution contains about 4 g of carbon black (SB4A), about 30 g of the polyimide powder, about 204 g of DMAC, and about 407 g of the polyamic acid solution.

Example 6-11

A double-layer film can be prepared like in Example 6-9 except that the first black PAA solution contains about 4 g of carbon black (SB4A), about 50 g of the polyimide powder, about 324 g of DMAC, and about 284 g of the polyamic acid solution.

Example 6-12

A double-layer film can be prepared like in Example 6-3 except that the second black PAA solution only contains the polyamic acid solution and no carbon black is incorporated.

Example 6-13

A double-layer film can be prepared like in Example 6-3 except that the first black PAA solution contains about 50 g of the polyimide powder, about 300 g of DMAC, and about 309 g of the polyamic acid solution, and no carbon black is incorporated.

Comparative Example 6-1

A double-layer film can be prepared like in Example 6-1 except that the first black PAA solution contains about 4 g of carbon black (SB4A), about 15 g of the polyimide powder, about 114 g of DMAC, and about 500 g of the polyamic acid solution.

Comparative Example 6-2

A double-layer film can be prepared like in Example 6-1 except that the first black PAA solution contains about 4 g of carbon black (SB4A), about 60 g of the polyimide powder, about 384 g of DMAC, and about 222 g of the polyamic acid solution.

Comparative Example 6-3

A double-layer film can be prepared like in Example 6-1 except that the first black PAA solution contains about 10 g of carbon black (SB4A), about 20 g of the polyimide powder, about 180 g of DMAC, and about 432 g of the polyamic acid solution. Moreover, the second black PAA solution contains about 10 g of carbon black (SB4A), about 60 g of DMAC, and about 556 g of the polyamic acid solution.

Comparative Example 6-4

A double-layer film can be prepared like in Example 6-1 except that the first and second black PAA solutions respectively contain about 4 g of carbon black (SB4A), about 24 g of DMAC, and about 593 g of the polyamic acid solution.

Comparative Example 6-5

A double-layer film can be prepared like in Example 6-7 except that the first and second black PAA solutions respectively contain about 4 g of carbon black (SB4A), about 30 g of the polyimide powder, about 204 g of DMAC, and about 407 g of the polyamic acid solution.

Comparative Example 6-6

A double-layer film can be prepared like in Comparative Example 6-5 except that the first black PAA solution contains about 4 g of carbon black (SB4A), about 50 g of the polyimide powder, about 324 g of DMAC, and about 284 g of the polyamic acid solution.

Comparative Example 6-7

About 407 g of a polyamic acid solution having 18 wt % of solid content can be formed from polymerization of 4,4'-ODA and PMDA (molar ratio 1:1). Moreover, about 4 g of carbon black (SB4A), about 30 g of the polyimide powder and about 144 g of DMAC can be mixed together and agitated for 60 minutes. After being processed through a grinder, the resulting mixture can be mixed homogeneously with about 407 g of the polyamic acid solution to obtain a black PAA solution.

The black PAA solution is coated on a glass plate support and baked at a temperature of about 80° C. for 30 minutes to remove most solvent, and then at 370° C. for 4 hours to form a single-layer polyimide film.

Comparative Example 6-8

A triple-layer film can be prepared like in Example 6-4 except that the first black PAA solution contains about 4 g of carbon black (SB4A), about 60 g of the polyimide powder, about 384 g of DMAC, and about 222 g of the polyamic acid solution.

Comparative Example 6-9

A triple-layer film can be prepared like in Example 6-4 except that the first black PAA solution contains about 4 g of carbon black (SB4A), about 384 g of DMAC, and about 593 g of the polyamic acid solution. Moreover, the second black PAA solution contains about 4 g of carbon black (SB4A), about 50 g of the polyimide powder, and about 324 g of DMAC and about 284 g of the polyamic acid solution.

Testing of Film Properties of the Multilayer Polyimide Film

60° gloss value (GU) is measured by using a gloss meter (Micro Tri Gloss-BYK Gardner). Total Transparency (TT) is measured by using Nippon Denshoku NDH 2000 Haze Meter. Elongation is measured by using the universal material testing machine (Hounsfield H10ks) based on ASTM D288. Surface resistivity is measured by using Agilent 4339B with 16008B Resistivity Cell. The test results are shown in Table 4.

TABLE 4 properties of the multilayered polyimide film

| | Additives included in each layer | | | Carbon black (wt %) | | | Polyimide powder (wt %) | | | Gloss (GU) | | TT | Elongation | Surface resistivity |
|---|---|---|---|---|---|---|---|---|---|---|---|---|---|---|
| | 1st | 2nd | 3rd | 1st | 2nd | 3rd | 1st | 2nd | 3rd | Surface A | Surface B | (%) | (%) | (Ω) |
| Example | | | | | | | | | | | | | | |
| 6-1 | D/C | C | X | 4 | 4 | X | 20 | 0 | X | 4.1 | 101 | 0.07 | >30 | >$10^{15}$ |
| 6-2 | D/C | C | X | 4 | 4 | X | 30 | 0 | X | 2.7 | 99 | 0.05 | >30 | >$10^{15}$ |
| 6-3 | D/C | C | X | 4 | 4 | X | 50 | 0 | X | 0.7 | 97 | 0.04 | >30 | >$10^{15}$ |
| 6-4 | D/C | C | D/C | 4 | 4 | 4 | 20 | 0 | 20 | 4.3 | 4.5 | 0.01 | >30 | >$10^{15}$ |

TABLE 4-continued properties of the multilayered polyimide film

| | Additives included in each layer | | | Carbon black (wt %) | | | Polyimide powder (wt %) | | | Gloss (GU) | | TT (%) | Elongation (%) | Surface resistivity ($\Omega$) |
|---|---|---|---|---|---|---|---|---|---|---|---|---|---|---|
| | 1st | 2nd | 3rd | 1st | 2nd | 3rd | 1st | 2nd | 3rd | Surface A | Surface B | | | |
| 6-5 | D/C | C | D/C | 4 | 4 | 4 | 50 | 0 | 50 | 0.7 | 0.8 | 0.01 | >30 | >$10^{15}$ |
| 6-6 | D/C | C | X | 6 | 6 | X | 20 | 0 | X | 4.3 | 101 | 0.01 | >30 | >$10^{15}$ |
| 6-7 | D/C | D/C | X | 4 | 4 | X | 20 | 3 | X | 4.2 | 48 | 0.11 | >30 | >$10^{15}$ |
| 6-8 | D/C | D/C | X | 4 | 4 | X | 20 | 10 | X | 4.5 | 13 | 0.08 | >30 | >$10^{15}$ |
| 6-9 | D/C | D/C | X | 4 | 4 | X | 20 | 20 | X | 4.1 | 4.3 | 0.03 | >30 | >$10^{15}$ |
| 6-10 | D/C | D/C | X | 4 | 4 | X | 30 | 20 | X | 2.5 | 4.2 | 0.01 | >30 | >$10^{15}$ |
| 6-11 | D/C | D/C | X | 4 | 4 | X | 50 | 20 | X | 0.7 | 4.1 | 0.01 | >30 | >$10^{15}$ |
| 6-12 | D/C | C | X | 4 | 0 | X | 50 | 0 | X | 0.8 | 99 | 0.15 | >30 | >$10^{15}$ |
| 6-13 | D/C | C | X | 0 | 4 | X | 50 | 0 | X | 0.9 | 99 | 0.17 | >30 | >$10^{15}$ |
| Comparative Example | | | | | | | | | | | | | | |
| 6-1 | D/C | C | X | 4 | 4 | X | 15 | 0 | X | 10.3 | 98 | 0.12 | >30 | >$10^{15}$ |
| 6-2 | D/C | C | X | 4 | 4 | X | 60 | 0 | X | 0.4 | 97 | 0.04 | <20 | >$10^{15}$ |
| 6-3 | D/C | C | X | 10 | 10 | X | 20 | 0 | X | 4.2 | 97 | 0 | >30 | over current |
| 6-4 | C | C | X | 4 | 4 | X | 0 | 0 | X | 101 | 98 | 0.12 | >30 | >$10^{15}$ |
| 6-5 | D/C | D/C | X | 4 | 4 | X | 30 | 30 | X | 2.3 | 2.4 | 0.01 | <20 | >$10^{15}$ |
| 6-6 | D/C | D/C | X | 4 | 4 | X | 50 | 30 | X | 0.8 | 2.4 | 0.01 | <20 | >$10^{15}$ |
| 6-7 | D/C | X | X | 4 | X | X | 30 | X | X | 2.7 | 3.5 | 0.05 | <20 | >$10^{15}$ |
| 6-8 | D/C | C | D/C | 4 | 4 | 4 | 60 | 0 | 60 | 0.7 | 0.8 | 0.01 | <20 | >$10^{15}$ |
| 6-9 | C | D/C | C | 4 | 4 | 4 | 0 | 50 | 0 | 86 | 89 | 0.02 | >30 | >$10^{15}$ |

Figure 2:
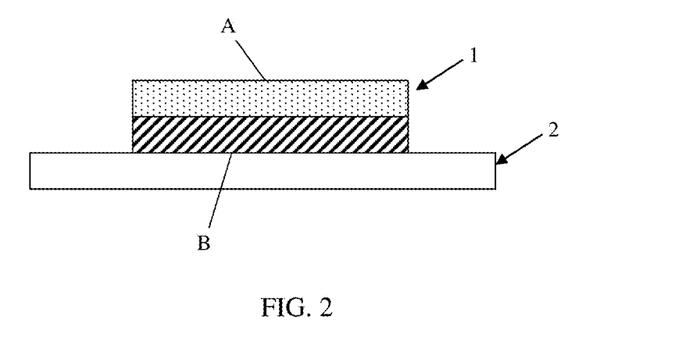
FIG. 2 is a schematic view illustrating a double-layer polyimide film incorporating polyimide powder delustrant.
Figure 3:
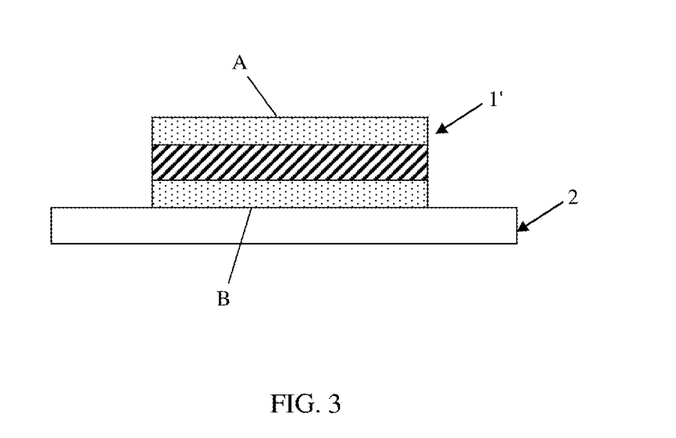
FIG. 3 is a schematic view illustrating a triple-layer polyimide film incorporating polyimide powder delustrant.

In Table 4, "D" means delustrant (i.e., polyimide powder), "C" means carbon black, "X" means no layer, "Surface A" refers to the outmost surface of the multilayered film that is exposed outward and was not in contact with the plate support 2 during the fabrication process (FIG. 2 illustrates the example of a double-layer film 1 formed on the plate support 2, and FIG. 3 illustrates the example of a triple-layer film 1' formed on the plate support 2), and "Surface B" refers the outmost surface of the multilayered film that was in contact with the plate support 2 during the fabrication process (as shown in FIGS. 2 and 3).

According to Table 4, the multilayered films of Examples 6-1 to 6-13 exhibit desired film properties including low gloss value (lower than 5), low light transmittance (lower than 0.2%), good elongation rate (higher than 30%) and good insulation. In Examples 6-4 and 6-5, when the first and the third layers contain 20-50 wt % of polyimide powder, the gloss values of both of Surface A and Surface B are lower than 5.

When the ratio of the polyimide powder is too low (e.g., 15 wt % in Comparative Example 6-1), the desired gloss value cannot be obtained. When the ratio of polyimide powder is too high (e.g., Comparative Examples 6-2, 6-5 to 6-8), the mechanical properties such as elongation rate become poor.

The carbon black may also affect the electric conduction of the film: when the ratio of carbon black in the layer is too high (e.g., Comparative Example 6-3), no desirable insulation property can be obtained.

Preparation of the Polyimide Film Having a Metal Layer

Example 7-1

A polyamic acid solution containing 18 wt % of solid content can be formed from polymerization of 4,4'-ODA and PMDA (molar ratio 1:1). Moreover, about 4 g of carbon black (SB4A), about 10 g of the polyimide powder, and about 84 g of DMAC can be mixed together and agitated for 60 minutes. After processing through a grinder, this mixture can be mixed homogeneously with about 519 g of the polyamic acid solution to obtain a black PAA solution.

The black PAA solution is coated on a glass plate support and baked at a temperature of about 80° C. for 30 minutes to remove the solvent, and then at 370° C. for 4 hours to form a single-layer polyimide film (containing 10% of polyimide powder).

The black polyimide film is peeled from the glass plate support, and an aluminum layer with a thickness of about 70 nm is formed on the surface that was in contact with the glass plate support before peeling. The metal layer can be formed by thermal evaporation under vacuum of about $10^{-6}$ torr.

Example 7-2

A film can be prepared like in Example 7-1 except that the aluminum layer is replaced with a silver layer having a thickness of about 70 nm.

Example 7-3

A film can be prepared like in Example 7-2 except that single-layer polyimide film is replaced with the double-layer polyimide film of Example 6-2.

Comparative Example 7-1

A single-layer polyimide film can be prepared like in Comparative Example 6-7 except that the black PAA solution contains about 4 g of carbon black (SB4A), about 10 g of the polyimide powder, about 84 g of DMAC, and about 519 g of the polyamic acid solution.

Measure of Electromagnetic Interference (EMI) Shielding Effectiveness.

The efficiency of EMI shielding is detected by using HP Network/Spectrum/Impedance Analyzer based on ASTM 4935. The average results of 500 MHz to 2 GHz is obtained. The results are shown in Table 5.

TABLE 5

| Example | Additives 1st | Additives 2nd | Carbon black 1st (wt %) | Carbon black 2nd (wt %) | Polyimide powder 1st (wt %) | Polyimide powder 2nd (wt %) | Metal layer | EMI shielding effectiveness (dB) |
|---|---|---|---|---|---|---|---|---|
| 7-1 | D/C | X | 4 | X | 10 | X | Al | 30 |
| 7-2 | D/C | X | 4 | X | 10 | X | Ag | 50 |
| 7-3 | D/C | C | 4 | 4 | 30 | X | Ag | 50 |
| 6-2 | D/C | C | 4 | 4 | 30 | 0 | X | 0 |
| C.E. 6-10 | D/C | X | 4 | X | 10 | X | X | 0 |

In Table 5, "C.E." means Comparative Example, "D" means delustrant (i.e., polyimide powder), "C" means carbon black, and "X" means no layer.

Table 5 shows that the multilayered polyimide films can further include a metal layer to provide about 30-50 dB of EMI shielding under the frequency of 500 MHz to 2 GHz. Accordingly, applications of the multilayered polyimide films described herein can include EMI shielding in the manufacture of flexible PCB. Moreover, the polyimide films can have low gloss and low light transmittance (<0.2%), and can have good mechanical properties and insulation.

The embodiments and examples described herein can fabricate polyimide powders with enhanced extinction effects, high insulation and good heat resistance. The polyimide powder may be used in association with a carbon black pigment (e.g., in an amount of about 2-10 wt %) to fabricate black polyimide films that have high shading property, low gloss, enhanced insulation and heat resistance.

Examples of applications for the polyimide films can include, without limitation, flexible printed boards (FPC), rigid printed boards, flexible-rigid printed board, LCD, LED, photovoltaic cells, TFT-LCD, OLED, portable communication device, digital camera, laptop, e-book, tablet PC and the like.

Realizations of the films, polyimide powder delustrants and related fabrication methods have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A polyimide film comprising:
   a first polyimide layer including a polyimide base polymer and a polyimide powder distributed in the polyimide base polymer, the polyimide powder being derived from diamine monomers and dianhydride monomers with a diamine-to-dianhydride molar ratio of about 1:0.950 to about 1:0.995, and the polyimide powder being present in the first polyimide layer at a weight ratio between about 20 wt % and about 50 wt % of the total weight of the first polyimide layer; and
   a second polyimide layer stacked on a surface of the first polyimide layer.

2. The polyimide film according to claim 1, wherein the diamine monomers are oxydianiline (ODA), and the dianhydride monomers are pyromellitic dianhydride (PMDA).

3. The polyimide film according to claim 1, wherein the polyimide powder has an average particle size between about 2 μm and about 10 μm.

4. The polyimide film according to claim 1, further comprising a color pigment distributed in the polyimide base polymer.

5. The polyimide film according to claim 4, wherein the color pigment has a weight ratio between about 2 wt % and about 10 wt % of the weight of the first polyimide layer.

6. The polyimide film according to claim 4, wherein the color pigment is carbon black.

7. The polyimide film according to claim 1, wherein the second polyimide layer also includes the polyimide powder at a weight ratio less than about 20 wt % of the total weight of the second polyimide layer.

8. The polyimide film according to claim 1, further including a third polyimide layer, the second polyimide layer being sandwiched between the first polyimide layer and the third polyimide layer.

9. The polyimide film according to claim 8, wherein the third polyimide layer contains polyimide powder at a weight ratio between about 20 wt % and about 50 wt % of the total weight of the third polyimide layer.

10. A polyimide film comprising:
    a first and a second polyimide layer stacked on each other;
    a polyimide powder incorporated in each of the first and second polyimide layer, one of the first and second polyimide layer containing the polyimide powder at a weight ratio between about 20 wt % and about 50 wt % of the total weight thereof; and
    a color pigment incorporated in the first polyimide layer.

11. The polyimide film according to claim 10, wherein the quantity of the polyimide powder present in the first polyimide layer is different from that present in the second polyimide layer.

12. The polyimide film according to claim 10, wherein the other one of the first and second polyimide layer contains the polyimide powder at a weight ratio less than about 20 wt % of the total weight thereof.

13. The polyimide film according to claim 10, wherein the polyimide powder is derived from diamine monomers and dianhydride monomers with a diamine-to-dianhydride molar ratio of about 1:0.950 to about 1:0.995.

14. The polyimide film according to claim 13, wherein the diamine monomers are oxydianiline (ODA), and the dianhydride monomers are pyromellitic dianhydride (PMDA).

15. The polyimide film according to claim 10, wherein the color pigment has a weight ratio between about 2 wt % and about 10 wt % of the weight of the first polyimide layer.

16. A polyimide film comprising:
    a first, a second and a third polyimide layer stacked on one another, the second polyimide layer being sandwiched between the first and the third polyimide layer;
    a polyimide powder incorporated in each of the first and third polyimide layer, each of the first and third polyimide layer respectively containing the polyimide powder at a weight ratio between about 20 wt % and about 50 wt % of the total weight thereof, and the second polyimide layer having no polyimide powder; and
    a color pigment present in at least one of the first, second and third polyimide layer.

17. The polyimide film according to claim 16, wherein the color pigment is present with a weight ratio between about 2 wt % and about 10 wt %.

* * * * *